(12) United States Patent
Liu et al.

(10) Patent No.: US 7,499,909 B2
(45) Date of Patent: Mar. 3, 2009

(54) TECHNIQUES OF USING A RELATIONAL CACHING FRAMEWORK FOR EFFICIENTLY HANDLING XML QUERIES IN THE MID-TIER DATA CACHING

(75) Inventors: Zhen Hua Liu, San Mateo, CA (US); Muralidhar Krishnaprasad, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 312 days.

(21) Appl. No.: 11/481,159

(22) Filed: Jul. 3, 2006

(65) Prior Publication Data

US 2008/0005093 A1    Jan. 3, 2008

(51) Int. Cl.
*G06F 17/30*   (2006.01)
(52) U.S. Cl. .................. 707/2; 707/1; 707/3; 707/100; 707/101; 707/104.1
(58) Field of Classification Search .................. 707/1–3, 707/10, 100, 101, 103 R, 104.1
See application file for complete search history.

(56) References Cited

U.S. PATENT DOCUMENTS

| | | |
|---|---|---|
| 5,210,686 A | 5/1993 | Jernigan |
| 5,369,763 A | 11/1994 | Biles |
| 5,404,513 A | 4/1995 | Powers et al. |
| 5,410,691 A | 4/1995 | Taylor |
| 5,454,101 A | 9/1995 | Mackay et al. |

(Continued)

FOREIGN PATENT DOCUMENTS

EP    1 241 589    9/2002

(Continued)

OTHER PUBLICATIONS

MacKenzie, David et al., "Finding Files", GNU Findutils Version 4.1.2, Nov. 1994, 38 pages.

(Continued)

*Primary Examiner*—Cam-Linh Nguyen
(74) *Attorney, Agent, or Firm*—Hickman Palermo Truong & Becker LLP

(57) ABSTRACT

A method and apparatus for processing queries is provided. A query is received at a mid-tier node of a multi-tier system. The mid-tier node includes a mid-tier cache that is configured to cache relational tables from one or more databases managed by a database server in a database tier of the multi-tier system. At the mid-tier node, a determination is made whether the received query includes an operator for requesting data of an XML datatype from the database server, where the XML datatype is supported as a native datatype by the database server. If a determination is made that the query includes such operator, then one or more portions of one or more relational tables are retrieved from the database server and stored in the mid-tier cache. The one or more relational tables store, in the one or more portions, index information associated with the requested data of the XML datatype. The received query is rewritten into a relational query against at least the one or more portions of the one or more relational tables that are stored in the mid-tier cache.

26 Claims, 3 Drawing Sheets

U.S. PATENT DOCUMENTS

| | | |
|---|---|---|
| 5,467,471 A | 11/1995 | Bader |
| 5,524,240 A | 6/1996 | Barbara et al. |
| 5,530,849 A | 6/1996 | Hanushevsky et al. |
| 5,544,360 A | 8/1996 | Lewak et al. |
| 5,546,571 A | 8/1996 | Shan et al. |
| 5,568,640 A | 10/1996 | Nishiyama et al. |
| 5,630,125 A | 5/1997 | Zellweger |
| 5,643,633 A | 7/1997 | Telford et al. |
| 5,680,614 A | 10/1997 | Bakuya et al. |
| 5,701,467 A | 12/1997 | Freeston |
| 5,838,965 A | 11/1998 | Kavanagh et al. |
| 5,842,212 A | 11/1998 | Balluvio et al. |
| 5,870,590 A | 2/1999 | Kita et al. |
| 5,878,415 A | 3/1999 | Olds |
| 5,917,492 A | 6/1999 | Bereiter et al. |
| 5,921,582 A | 7/1999 | Gusack |
| 5,960,194 A | 9/1999 | Choy et al. |
| 5,964,407 A | 10/1999 | Sandkleiva |
| 5,974,407 A | 10/1999 | Sacks |
| 5,983,215 A | 11/1999 | Ross et al. |
| 5,987,506 A | 11/1999 | Carter et al. |
| 5,999,941 A | 12/1999 | Andersen |
| 6,012,067 A | 1/2000 | Sarkar |
| 6,038,563 A | 3/2000 | Bapat et al. |
| 6,052,785 A | 4/2000 | Lin et al. |
| 6,055,544 A | 4/2000 | DeRose et al. |
| 6,061,684 A | 5/2000 | Glasser et al. |
| 6,067,623 A | 5/2000 | Blakley et al. |
| 6,101,500 A | 8/2000 | Lau |
| 6,111,578 A | 8/2000 | Tesler |
| 6,112,209 A | 8/2000 | Gusack |
| 6,128,610 A | 10/2000 | Srinivasan et al. |
| 6,134,594 A | 10/2000 | Helland et al. |
| 6,141,655 A | 10/2000 | Johnson et al. |
| 6,154,741 A | 11/2000 | Feldman |
| 6,182,121 B1 | 1/2001 | Wlaschin |
| 6,192,273 B1 | 2/2001 | Igel et al. |
| 6,192,373 B1 | 2/2001 | Haegele |
| 6,199,195 B1 | 3/2001 | Goodwin et al. |
| 6,208,993 B1 | 3/2001 | Shadmon |
| 6,236,988 B1 | 5/2001 | Aldred |
| 6,240,407 B1 | 5/2001 | Chang et al. |
| 6,253,195 B1 | 6/2001 | Hudis et al. |
| 6,263,332 B1 | 7/2001 | Nasr et al. |
| 6,269,380 B1 | 7/2001 | Terry et al. |
| 6,279,006 B1 | 8/2001 | Shigemi et al. |
| 6,282,537 B1 | 8/2001 | Madnick et al. |
| 6,298,349 B1 | 10/2001 | Toyoshima et al. |
| 6,330,573 B1 | 12/2001 | Salisbury et al. |
| 6,341,289 B1 | 1/2002 | Burroughs et al. |
| 6,343,287 B1 | 1/2002 | Kumar et al. |
| 6,356,920 B1 | 3/2002 | Vandersluis |
| 6,366,934 B1 | 4/2002 | Cheng et al. |
| 6,370,537 B1 | 4/2002 | Gilbert et al. |
| 6,393,456 B1 | 5/2002 | Ambler et al. |
| 6,418,448 B1 | 7/2002 | Sarkar |
| 6,427,123 B1 | 7/2002 | Sedlar |
| 6,438,540 B2 | 8/2002 | Nasr et al. |
| 6,438,562 B1 | 8/2002 | Gupta et al. |
| 6,449,620 B1 | 9/2002 | Draper et al. |
| 6,470,344 B1 | 10/2002 | Kothuri et al. |
| 6,487,546 B1 | 11/2002 | Witkowski |
| 6,496,842 B1 | 12/2002 | Lyness |
| 6,519,597 B1 | 2/2003 | Cheng et al. |
| 6,584,459 B1 | 6/2003 | Chang et al. |
| 6,604,100 B1 | 8/2003 | Fernandez et al. |
| 6,636,845 B2 | 10/2003 | Chau et al. |
| 6,643,633 B2 | 11/2003 | Chau et al. |
| 6,654,734 B1 | 11/2003 | Mani et al. |
| 6,678,672 B1 | 1/2004 | Ramasamy et al. |
| 6,697,805 B1 | 2/2004 | Choquier et al. |
| 6,708,186 B1 | 3/2004 | Claborn et al. |
| 6,714,962 B1 | 3/2004 | Helland et al. |
| 6,725,212 B2 | 4/2004 | Couch et al. |
| 6,732,222 B1 | 5/2004 | Garritsen et al. |
| 6,766,334 B1 | 7/2004 | Kaier et al. |
| 6,772,350 B1 | 8/2004 | Belani et al. |
| 6,778,977 B1 | 8/2004 | Avadhanam et al. |
| 6,782,380 B1 | 8/2004 | Thede |
| 6,785,673 B1 | 8/2004 | Fernandez et al. |
| 6,795,821 B2 | 9/2004 | Yu |
| 6,799,251 B1 | 9/2004 | Jacobs et al. |
| 6,826,727 B1 | 11/2004 | Mohr et al. |
| 6,836,778 B2 | 12/2004 | Manikutty et al. |
| 6,836,857 B2 | 12/2004 | Ten-Hove et al. |
| 6,959,416 B2 | 10/2005 | Manning et al. |
| 7,031,956 B1 | 4/2006 | Lee et al. |
| 7,043,472 B2 | 5/2006 | Aridor et al. |
| 7,043,488 B1 | 5/2006 | Baer et al. |
| 7,043,716 B2 | 5/2006 | Zimmer et al. |
| 7,062,507 B2 | 6/2006 | Wang et al. |
| 7,117,216 B2 | 10/2006 | Chakraborty et al. |
| 7,139,746 B2 | 11/2006 | Shin et al. |
| 7,162,485 B2 | 1/2007 | Gottlob et al. |
| 7,171,404 B2 | 1/2007 | Lindblad et al. |
| 7,171,407 B2 | 1/2007 | Barton et al. |
| 7,181,438 B1 | 2/2007 | Szabo |
| 7,216,127 B2 | 5/2007 | Auerbach |
| 2001/0037345 A1 | 11/2001 | Kiernan et al. |
| 2001/0049675 A1 | 12/2001 | Mandler et al. |
| 2002/0015042 A1 | 2/2002 | Robotham et al. |
| 2002/0056025 A1 | 5/2002 | Qui et al. |
| 2002/0073019 A1 | 6/2002 | Deaton |
| 2002/0078068 A1 | 6/2002 | Krishnaprasad et al. |
| 2002/0100027 A1 | 7/2002 | Binding et al. |
| 2002/0116371 A1 | 8/2002 | Dodds et al. |
| 2002/0116457 A1 | 8/2002 | Eshleman et al. |
| 2002/0120685 A1 | 8/2002 | Srivastava et al. |
| 2002/0124100 A1 | 9/2002 | Adams |
| 2002/0133484 A1 | 9/2002 | Chau et al. |
| 2002/0143512 A1 | 10/2002 | Shamoto et al. |
| 2002/0143773 A1 | 10/2002 | Spicer et al. |
| 2002/0152267 A1 | 10/2002 | Lennon |
| 2002/0156811 A1 | 10/2002 | Krupa |
| 2002/0169788 A1 | 11/2002 | Lee et al. |
| 2002/0184188 A1 | 12/2002 | Mandyam et al. |
| 2002/0184401 A1 | 12/2002 | Kadel, Jr. et al. |
| 2002/0188613 A1 | 12/2002 | Chakraborty et al. |
| 2002/0194157 A1 | 12/2002 | Zait et al. |
| 2002/0198874 A1 | 12/2002 | Nasr et al. |
| 2003/0004937 A1 | 1/2003 | Salmenkaita et al. |
| 2003/0009361 A1 | 1/2003 | Hancock et al. |
| 2003/0014397 A1 | 1/2003 | Chau et al. |
| 2003/0065659 A1 | 4/2003 | Agarwal et al. |
| 2003/0078906 A1 | 4/2003 | Ten-Hove et al. |
| 2003/0093672 A1 | 5/2003 | Cichowlas |
| 2003/0101194 A1 | 5/2003 | Rys et al. |
| 2003/0105732 A1 | 6/2003 | Kagalwala et al. |
| 2003/0131051 A1 | 7/2003 | Lection et al. |
| 2003/0140308 A1 | 7/2003 | Murthy et al. |
| 2003/0158897 A1 | 8/2003 | Ben-Natan et al. |
| 2003/0167257 A1 | 9/2003 | de Bonet |
| 2003/0167456 A1* | 9/2003 | Sabharwal .................. 717/108 |
| 2003/0177341 A1 | 9/2003 | Devillers |
| 2003/0182624 A1 | 9/2003 | Large |
| 2003/0200214 A1 | 10/2003 | Doole et al. |
| 2003/0212662 A1 | 11/2003 | Shin et al. |
| 2003/0212664 A1 | 11/2003 | Breining et al. |
| 2003/0233618 A1 | 12/2003 | Wan |
| 2004/0010752 A1 | 1/2004 | Chan et al. |
| 2004/0015783 A1 | 1/2004 | Lennon et al. |
| 2004/0043758 A1 | 3/2004 | Sorvari et al. |
| 2004/0044659 A1 | 3/2004 | Judd et al. |
| 2004/0060006 A1 | 3/2004 | Lindblad et al. |

| | | | |
|---|---|---|---|
| 2004/0064466 | A1 | 4/2004 | Manikutty et al. |
| 2004/0088320 | A1 | 5/2004 | Perry |
| 2004/0088415 | A1 | 5/2004 | Chandrasekar et al. |
| 2004/0103105 | A1 | 5/2004 | Lindblad et al. |
| 2004/0143581 | A1 | 7/2004 | Bohannon et al. |
| 2004/0148278 | A1 | 7/2004 | Milo et al. |
| 2004/0167864 | A1 | 8/2004 | Wang et al. |
| 2004/0167904 | A1 | 8/2004 | Wen et el. |
| 2004/0176958 | A1 | 9/2004 | Salmenkaita et al. |
| 2004/0193575 | A1 | 9/2004 | Chen et al. |
| 2004/0205551 | A1 | 10/2004 | Santos |
| 2004/0215600 | A1 | 10/2004 | Aridor et al. |
| 2004/0220912 | A1 | 11/2004 | Manikutty et al. |
| 2004/0220927 | A1 | 11/2004 | Murthy et al. |
| 2004/0221226 | A1 | 11/2004 | Lin et al. |
| 2004/0225680 | A1 | 11/2004 | Cameron et al. |
| 2004/0230667 | A1 | 11/2004 | Wookey |
| 2004/0260691 | A1 | 12/2004 | Desai et al. |
| 2004/0267760 | A1 | 12/2004 | Brundage et al. |
| 2005/0004892 | A1 | 1/2005 | Brundage et al. |
| 2005/0010896 | A1 | 1/2005 | Meliksetian et al. |
| 2005/0022115 | A1 | 1/2005 | Baumgartner et al. |
| 2005/0038688 | A1 | 2/2005 | Collins et al. |
| 2005/0050016 | A1 | 3/2005 | Stanoi et al. |
| 2005/0050058 | A1 | 3/2005 | Jain et al. |
| 2005/0050092 | A1 | 3/2005 | Jain et al. |
| 2005/0091188 | A1 | 4/2005 | Pal et al. |
| 2005/0097084 | A1 | 5/2005 | Balmin et al. |
| 2005/0102256 | A1 | 5/2005 | Bordawekar et al. |
| 2005/0114314 | A1 | 5/2005 | Fan et al. |
| 2005/0120031 | A1 | 6/2005 | Ishii |
| 2005/0160076 | A1 | 7/2005 | Kanemasa |
| 2005/0160108 | A1 | 7/2005 | Charlet et al. |
| 2005/0228792 | A1 | 10/2005 | Chandrasekaran et al. |
| 2005/0228818 | A1 | 10/2005 | Murthy et al. |
| 2005/0229158 | A1 | 10/2005 | Thusoo et al. |
| 2005/0257201 | A1 | 11/2005 | Rose et al. |
| 2005/0289125 | A1 | 12/2005 | Liu et al. |
| 2005/0289138 | A1 | 12/2005 | Cheng et al. |
| 2006/0031204 | A1 | 2/2006 | Liu et al. |
| 2006/0129584 | A1 | 6/2006 | Hoang et al. |
| 2006/0195476 | A1* | 8/2006 | Nori et al. ............... 707/104.1 |
| 2006/0242563 | A1 | 10/2006 | Liu et al. |
| 2007/0239681 | A1 | 10/2007 | Krishnaprasad et al. |

FOREIGN PATENT DOCUMENTS

| | | |
|---|---|---|
| GB | 2409078 A | 6/2005 |
| WO | WO 00/49533 | 8/2000 |
| WO | WO 01/42881 | 6/2001 |
| WO | WO 01/59602 | 8/2001 |
| WO | WO 01/61566 | 8/2001 |
| WO | WO 03/027908 | 4/2003 |

OTHER PUBLICATIONS

Rantzau, R. et al., "A Multi-tier Architecture for High-Performance Data Mining", University of Stuttgart, Institute of Parallel and Distributed High-Performance Systems, 13 pages.

Luo et al., "Middle-Tier Database Caching for e-Business", Computer Science department, University of Wisconsin, Madison, pp. 600-611.

U.S. Appl. No. 10/948,523, filed Sep. 22, 2004.

U.S. Appl. No. 10/944,177, filed Sep. 16, 2004.

International Preliminary Examining Authority, "Notification of Transmittal of the International Preliminary Report on Patentability," PCT/US2005/021259, dated Feb. 2, 2007, 9 pages.

Claims, PCT/US2005/021259, dated Nov. 30, 2006, 8 pages (attached).

Rys, Michael et al., "Integrating XQuery and Relational Database Systems," Chapter 7—*XQuery from the Experts: A Guide to the W3C XML Query Language*, Addison Wesley Professional, Aug. 22, 2003, ISBN 978-0-321-18060-5, pp. 353-391.

Office Action from China for foreign patent application No. 200480011704.3 dated Feb. 29, 2008 (6 pgs).

Current claims in China for foreign patent application No. 200480011704.3 (4 pgs).

Oracle 9I-XML Database Developer's Guide-Oracle, XML DB, Release 2(9.2), Part No. A96620-02, Part IV Chapter 10, 10-1 ~ 10-21, Shelley Higgins (24 pgs).

U.S. Appl. No. 10/884,311, filed Jul. 2, 2004.

U.S. Appl. No. 10/944,171, filed Sep. 16, 2004.

U.S. Appl. No. 11/034,490, filed Jan. 12, 2005.

U.S. Appl. No. 11/059,612, filed Feb. 15, 2005.

U.S. Appl. No. 10/944,170, filed Sep. 16, 2004.

International Preli minary Examining Authority, "Written Opinion," PCT/US2005/021259, dated Oct. 13, 2006, 7 pages.

Current Claims. PCT/US2005/021259, 10 pages.

"Notice of Allowance and Fee Due" received in 10/944,170 dated Apr. 7, 2008, 8 pages.

Girardot et al., "Millau: an encoding format for efficient representation and exchange of XMLover the Web", IBM Almaden Research Center, 24 pages.

Shankar Pal et al., "Indexing XML Data Stored in a Relational Database", Proceedings of the 30$^{th}$ VLDB Conference, 2004, 12 pages.

Mackenzie et al., "Finding Files", FindUtils, Version 4.1.2, Source Code, GNU.org, Nov. 1997, source files, code. C, 22 pages.

Cormen et al., "Introduction to Algorithms", MT Press, 2001, 2$^{nd}$ Edition, 4 pages.

European Patent Office, "Communication pursuant to Article 94 (3) EPC", European patent application 05732473.3-1225, dated Feb. 4, 2008, 7 pages.

State Intellectual Property Office of P.R.C., "Notification of the First Office Action", Chinese patent application 2005800186273.9, dated Oct. 12, 2007, 9 pages.

Claims, Chinese patent application 2005800186273.9, 3 pages.

Claims, European patent application 05732473.3-1225, 3 pages.

Banerjee, Sandeepan, et al. "Oracle8i—The XML Enabled Data Management System", Mar. 2000, IEEE, pp. 561-568.

Bohannon, Philip, et al. "From XML Schema to Relations: A Cost-Based Approach to XML Storage", Bell Laboratories, IEEE 2002, Proceedings of the 18th International Conference on Data Engineering (ICDE '02).

Bourret, R. et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

Braga, Daniele et al., "Graphical Environment to Query XML Data with Query," Proceedings of the Fourth International Conference on Web Information Systems Engineering (WISE '03), 2003, IEEE, 10 pages.

Chae, Mi-Ok, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Chen, Ruey-Shun et al., "Developing an XML framework for metadata system", Trinity College Dublin, Proc. of the 1st Inter. Sympo. on Information and Communication, pp. 267-272.

Cheng, Josephine, et al., "IBM DB2 XML Extender, An end-to-end solution for storing and retrieving XML documents," IEEE, ICDE '00 Conference, San Diego, Feb. 2000, 128 pages.

Cooper, Brian F. et al., "A Fast for Semistructured Data," Proceeding of the International Conference on Very Large Databases, 2001, XP-002303292, pp. 341-350.

Dayen, I., "Storing XML in Relational Databases", XML.com XP-002275971(1998-2004) pp. 1-13.

Draper, Denise, "Mapping Between XML and Relational Data" [online], Feb. 6, 2004, Retrieved from the Internet: <http://www.awprofessional.com/articles/printerfriendly.asp?p=169590>.

Funderbunk, J. et al., "XML programming with SQL/XML and XQuery", IBM Systems Journal XP-002295973 (2002) pp. 642-665.

Hierarchical Queries, XP-002295972, pp. 8-3 to 8-7.

Jajodia, Sushil, et al., "Toward a Multilevel Secure Relational Data Model," ACM, 1991, 8393 SIGMOD Record, Jun. 20, 1991, No. 2, New York, US, XP 00364619, pp. 50-59.

Jonah, Kevin, Databases Tag Along with XML [online], Jul. 1, 2002, [retrieved on Aug. 17, 2004]. Retrieved from the Internet: <http://www.gcn.com/21_17/guide/19148-1.html>.

Khan, Latifur, et al. "A Performance Evaluation of Storing XML Data in Relational Database Management Systems", ACM-2001 (pp. 31-38).

Kudrass, Thomas, "Management of XML Documents Without Schema in Relational Database Systems," Information and Software Technology, vol. 44, No. 4, Mar. 31, 2002, XP-004347776, pp. 269-275.

Lehmann, Mike, From XML to Storage and Back [online], [retrieved Aug. 17, 2004]. Retrieved from the Internet: <http://www.oracle.com/technology/oramag/oracle/03-mar/o23xml.html>.

Lo et al., "XAS: A System for Accessing Componentized, Virtual XML Documents," IEEE, 2001, pp. 493-502.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

McHugh, Jason et al., "Query Optimization for XML", XP-002333353, Proceedings of the 25th VLDB Conference (1999) pp. 315-326.

McHugh, Jason, et al. "Indexing Semistructured Data," Stanford Science Department, 1998, XP-002248313, pp. 1-21.

Melton, Jim, "ISO-ANSI Working Draft, XML-Related Specifications (SQL/XML)," WG3:DRS-020, H2-2002-365, Aug. 2002, 154 pages.

Michell, Nancy, Data Shredding, Updating the Status Bar, and More [online], Feb. 2003, [retrieved on Aug. 17, 2004]. Retrieved from the Internet: <http://msdn.microsoft.com/msdnmag/issues/03/03/WebQA/>.

Myllymaki, Jussi, "Effective Wed data Extraction with Standard XML Technologies," WWW10, May 1-5, 2001, pp. 689-696.

Noser, Hansrudi, et al., "Dynamic 3D Visualization of Database-Defined Tree Structures on the WWW by Using Rewriting Systems," 2000, IEEE, XP-002262516, pp. 247-254.

Oracle Corporation, "Oracle9i XML Database Developer's Guide—Oracle XML DB,"Release 2 (9.2), Mar. 2002, Part No. A96620-1, pp. 5-8-5-10, 5-21-5-24, 5-52-5-70, 10-5-10-20 and 11-1-11-20.

Peng, Feng et al., "XPath queries on streaming data", 2003, ACM Press, pp. 431-442.

Ramakrishnan, Ragu et al., "SRQL: Sorted Relational Query Language", Jul. 1-3 1998, IEEE, pp. 84-95.

Schmidt et al., "Why and How to Benchmark XML Databases," SIGMOND Record, vol. 3, No. 3, Sep. 2001, pp. 27-32.

Shanmugasundaram, Jayavel, et al., "Querying XML Views of Relational Data," Proceedings of the 27th Very Large Databases Conference, Rome, Italy, Sep. 2001, pp. 261-270.

Vion-Dury, Jean-Yves, "XPath on left and right sides of rules: toward compact XML tree rewriting node patterns", 2003, ACM Press, pp. 19-25.

Vorthmann, Scott et al., "Beyond Schemas, Schema Adjuncts and the Outside World," Markup Languages, Online!, vol. 2, No. 3, Jun. 2000, pp. 1-8.

W3C, "XML Fragment Interchange,"W3C Working Draft, Jun. 30, 1999, XP-002167090, 17 pages.

W3C, "XML Path Language (XPath) 2.0," W3C Recommendation, Working Draft, Oct. 29, 2004, retrieved from the internet: <http://www.w3.org/TR/2004/WD-xpath20-20041029>, retrieved on Apr. 14, 2005, pp. 1-111.

W3C, "XML Schema Part 1: Structures," W3C Recommendation, May 2, 2001, retrieved from the internet:<http://www.w3.org/TR/2001/REC-xmlschema-1-20010502/>, retrieved on Apr. 14, 2005, pp. 1-186.

W3C, "XML Schema Part 2: Datatypes," W3C Recommendation, May 2, 2001, retrieved from the internet:<http://www.w3.org/TR/2001/REC-xmlschema-2-20010502/>, retrieved on Apr. 14, 2005, pp. 1-138.

W3C, "XML Syntax for XQuery 1.0 (XQueryX)," W3C Recommendation, Working Draft, Dec. 19, 2003, retrieved from the internet:<http://www.w3.org/TR/2003/WD-xquery-20031219>, retrieved on Apr. 14, 2005, pp. 1-55.

W3C, "XQuery 1.0: An XML Query Language," W3C Recommendation, Working Draft, Oct. 29, 2004, retrieved from the internet:<http://www.w3.org/TR/2004/WD-xquery-20041029>, retrieved on Apr. 14, 2005, pp. 1-189.

W3C, XML Path Language (XPath) Version 1.0, W3C Recommendation Nov. 16, 1999 [online] Copyright 1999 [retrieved on Aug. 16, 2004]. Retrieved from the Internet: <http://www.w3.org/TR/xpath>.

Yoshikawa, Masatoshi et al., "XRel: A Path-Based Approach to Storage and Retrieval of XML Documents Using Relational Databases", XP-001143686, ACM Transactions on Internet Technology (2001), pp. 110-141.

Zemke, Fred, "XMLQuery," Change Proposal, ISO/IEC JTC1/SC32 WG3:SIA-nnn ANSI NCITS H2-2004-02lrl, Mar. 14, 2004, 29 pages.

Zhang, Wansong, et al., "An Encoding Scheme for Indexing XML Data," E-Commerce and E-Service, 2004, XP-010697639, pp. 526-529.

Zisman et al., "Using XML to Build Consistency Rules for Distributed Specifications," Proceedings of the Tenth International Workshop on Software Specification and Design (IWSD'00), IEEE 2000, 8 pages.

International Preliminary Examination Report, Application No. PCT/US03/35551, Oct. 8, 2004, pp. 1-17.

Written Opinion, Application No. PCT/US03/35551, Nov. 10, 2004, 6 pages.

Current claims in PCT/US03/35551, pp. 1-4.

International Preliminary Examination Report, Application No. PCT/US02/30783, Apr. 1, 2004, 15 pages.

Current claims in PCT/US02/30783, pp. 1-8.

International Searching Authority, "Notification of Transmittal of the International Search Report and the Written Opinion of the International Authority, or the Declaration," Nov. 2, 2004, PCT/US2004/010018, 14 pages.

PCT/US2004/010018—current claims.

AU Examiner's Report for foreign application No. 2004237062 dated May 20, 2008 (2 pgs).

Current claims in AU application No. 2004237062 (4 pgs).

European Patent Office, "Communication Pursuant to Article 94(3) EPC", Application No. 05 760 442.3-2201, dated Jun. 20, 2008, 2 pages.

Claims, Application No. 05 760 442.3-2201, 8 pages.

* cited by examiner

TECHNIQUES OF USING A RELATIONAL CACHING FRAMEWORK FOR EFFICIENTLY HANDLING XML QUERIES IN THE MID-TIER DATA CACHING

CROSS-REFERENCE TO RELATED APPLICATIONS

This application is related to U.S. patent application Ser. No. 10/259,278, entitled "MECHANISM FOR MAPPING XML SCHEMAS TO OBJECT-RELATIONAL DATABASE SYSTEMS", filed by Ravi Murthy et al. on Sep. 27, 2002, the entire contents of which is hereby incorporated by reference for all purposes as if fully set forth herein.

This application is related to U.S. patent application Ser. No. 10/428,443, entitled "TECHNIQUES FOR RETAINING HIERARCHICAL INFORMATION IN MAPPING BETWEEN XML DOCUMENTS AND RELATIONAL DATA", filed by Ravi Murthy et al. on May 1, 2003, the entire contents of which is hereby incorporated by reference for all purposes as if fully set forth herein.

This application is related to U.S. patent application Ser. No. 10/428,878, entitled "TECHNIQUES FOR REWRITING XML QUERIES DIRECTED TO RELATIONAL DATABASE CONSTRUCTS", filed by Anand Manikutty et al. on May 1, 2003, the entire contents of which is hereby incorporated by reference for all purposes as if fully set forth herein.

This application is related to U.S. patent application Ser. No. 10/884,311, entitled "INDEX FOR ACCESSING XML DATA", filed by Sivasankaran Chandrasekaran et al. on Jul. 2, 2004, the entire contents of which is hereby incorporated by reference for all purposes as if fully set forth herein.

This application is related to U.S. patent application Ser. No. 10/944,177, entitled "INDEX MAINTENANCE FOR OPERATIONS INVOLVING INDEXED XML DATA", filed by Ravi Murthy et al. on Sep. 16, 2004, the entire contents of which is hereby incorporated by reference for all purposes as if fully set forth herein.

This application is related to U.S. patent application Ser. No. 10/944,170, entitled "EFFICIENT QUERY PROCESSING OF XML DATA USING XML INDEX", filed by Ashish Thusoo et al. on Sep. 16, 2004, the entire contents of which is hereby incorporated by reference for all purposes as if fully set forth herein.

This application is related to U.S. patent application Ser. No. 10/948,523, entitled "EFFICIENT EVALUATION OF QUERIES USING TRANSLATION", filed by Zhen Hua Liu et al. on Sep. 22, 2004, the entire contents of which is hereby incorporated by reference for all purposes as if fully set forth herein.

This application is related to U.S. patent application Ser. No. 10/984,471, entitled "TECHNIQUES FOR PARTIAL REWRITE OF XPATH QUERIES IN A RELATIONAL DATABASE", filed by James W. Warner et al. on Nov. 8, 2004, the entire contents of which is hereby incorporated by reference for all purposes as if fully set forth herein.

This application is related to U.S. patent application Ser. No. 11/059,612, entitled "EFFICIENT EXTRACTION OF XML CONTENT STORED IN A LOB", filed by Sivasankaran Chandrasekaran et al. on Feb. 15, 2005, the entire contents of which is hereby incorporated by reference for all purposes as if fully set forth herein.

This application is related to U.S. patent application Ser. No. 11/261,684, entitled "OPTIMIZING XSLT BASED ON INPUT XML DOCUMENT STRUCTURE DESCRIPTION AND TRANSLATING XSLT INTO EQUIVALENT XQUERY EXPRESSIONS", filed by Zhen Hua Liu et al. on Oct. 28, 2005, the entire contents of which is hereby incorporated by reference for all purposes as if fully set forth herein.

This application is related to U.S. patent application Ser. No. 11/394,878, entitled "TECHNIQUES OF EFFICIENT XML META-DATA QUERY USING XML TABLE INDEX", filed by Muralidhar Krishnaprasad et al. on Mar. 31, 2006, the entire contents of which is hereby incorporated by reference for all purposes as if fully set forth herein.

FIELD OF THE INVENTION

The present invention generally relates to extensible Markup Language (XML). The invention relates more specifically to a method of processing queries for XML data by using mid-tier data caching framework.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In a multi-tier system that includes an outer tier comprising application servers and a database tier comprising database servers, data access performance and data availability are important factors that determine the response time to user queries and the overall system performance. In some multi-tier systems, a middle tier (also referred to hereinafter as "mid-tier") is provided between any outer tiers and the database tier. The mid-tier comprises servers that cache data managed by the database servers. The application servers in the outer tier typically send queries for data to the servers in the mid-tier instead of the database servers in the database tier, thus achieving high-speed access to the requested data.

In one example, a multi-tier system may be used in a large enterprise data-processing environment to provide faster access to the enterprise database servers. The multi-tier system may include a database tier comprising one or more Relational Database Management System (RDBMS) servers, an outer tier comprising one or more application servers, and a mid-tier comprising one or more servers and one or more relational caches. The mid-tier servers store in the relational caches, as relational tables, portions of the most-often accessed relational tables that are managed by the one or more RDBMS servers in one or more databases. The mid-tier servers may also provide synchronization and/or transactional replication mechanisms to propagate to the cached data any changes that are made to the original data in the underlying one or more databases. When an application server in the outer tier issues a query for data, instead of sending the query directly to an RDBMS server in the database tier, the application server sends the query to a server in the mid-tier. If the data is not found in a relational cache, then the mid-tier server sends the query to an RDBMS server for processing. If the data is found in a relational cache, which will be the case for the most-often accessed data, the mid-tier server responds to the query with data from the cache, thus shielding the RDBMS servers from the load associated with processing the query. In this way, application servers in the outer tier of the multi-tier system may open a large number of concurrent connections and may issue a large number of concurrent queries against enterprise database servers in the database tier without substantially increasing the load on the database servers.

Caching of often-accessed data in a mid-tier data cache is typically used in multi-tier systems in which the database tier comprises relational database servers that support Structured Query Language (SQL) query access to data stored in relational tables. However, the existing relational data caching frameworks do not provide mechanisms for efficiently processing of queries for XML data that may be stored in XML-enabled relational databases or in other type of XML-enabled storage, even though XML is widely accepted as a standard for describing and providing structure for a body of data, such as, for example, a file, a data stream, and a data packet.

Further, some XML-enabled RDBMS and Object-Relational Database Systems (ORDBMS) provide a native built-in datatype (referred to herein as a native XML datatype or just XML datatype) which allows users to store XML data natively in a database via the use of XML datatype tables or XML datatype columns. For example, some RDBMS support a built-in XML datatype, XMLType, for storing XML data natively in the database system. The XMLType datatype is based on the SQL/XML standard defined in INCITS/ISO/IEC 9075-14:2003, the entire contents of which are hereby incorporated by reference for all purposes as if fully set forth herein, and which is referred to hereinafter as the "SQL/XML 2003" standard. In some RDBMS, the XMLType datatype may further extend the SQL/XML 2003 standard by providing support for representing instances of data defined in the XQuery Data Model. The XQuery Data Model defines the permissible values of expressions in the XML Query Language (XQuery), the XML Path Language (XPath), and the extensible Style Language Transformation (XSLT). A draft specification for the XQuery Data Model is described in "XQuery 1.0 and XPath 2.0 Data Model", W3C Candidate Recommendation 3 Nov. 2005, located at "http://www.w3.org/TR/xpath-datamodel/", the entire contents of which are hereby incorporated by reference for all purposes as if fully set forth herein.

However, the existing relational data caching frameworks do not provide mechanisms for efficiently processing of queries for XML data that may be natively stored in XML-enabled relational databases as a built-in XML datatype. For example, in one approach a mid-tier relational cache may be used to cache data from one or more relational database tables that store XML data as a native XML datatype. According to this approach, a mid-tier server treats XML data of a native XML datatype as opaque data. The mid-tier server fetches, from a relational database into a mid-tier relational cache, the entire underlying relational tables that store the XML data. When a query requesting an instance of the XML data is received, the mid-tier server first materializes the XML data from the cached relational tables, and then runs any relevant SQL/XML, XQuery, XPath, or XSLT query processors over the materialized XML data.

The disadvantage of this approach is that it does not scale well. As the relational tables that store the XML data in the relational database grow larger, the relational cache in the mid-tier similarly grows larger. The reason for this is that in order to be able to materialize the XML data in response to a query, the mid-tier server needs to have in the mid-tier relational cache all of the relevant data from the underlying relational tables in the relational database. This, however, leads to losing the benefit of caching since the mid-tier relational cache needs to store essentially the entire relational tables that store the XML data as an XML datatype in the underlying relational database.

In addition, when the size of the XML data that is materialized in the mid-tier based on the mid-tier relational cache is large, the process of materializing the XML data and running the SQL/XML, XQuery, XPath, and/or XSLT processors over the materialized XML data becomes very resource intensive and computationally expensive. Further, unlike a relational database server that stores the XML data as a native XML datatype, a mid-tier server cannot avail itself of any XML indexes that may have been created in the database over the XML data stored in the relational database tables.

For example, in order to evaluate a query including an XPath operator for requesting an instance of XML data from a particular location in an XML document that is stored as a native XML datatype in a relational database, the mid-tier server needs to first materialize the entire XML document from the tables in the mid-tier relational cache. Then, the mid-tier server needs to build a Document Object Model (DOM) tree of the XML document in order to be able to execute the XPath operator and to determine the exact location of the requested XML data instance. In contrast, a relational database server that stores the XML document as a native XML datatype may have built an XML index over the XML document and, in response to the same query, may use the index to locate and retrieve the requested XML data instance without building a DOM tree. Thus, the existing approach for processing queries for XML data against a mid-tier relational cache is not only resource intensive and computationally expensive, but in some cases may even perform slower than if no data caching in the mid-tier were used at all.

Based on the foregoing, techniques for efficiently processing of queries for XML data by using mid-tier data caching framework are clearly needed. Further, there is also a clear need for techniques for processing of queries for XML data that may be stored in XML-enabled databases as a native XML datatype.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Structural Overview

Figure 1:
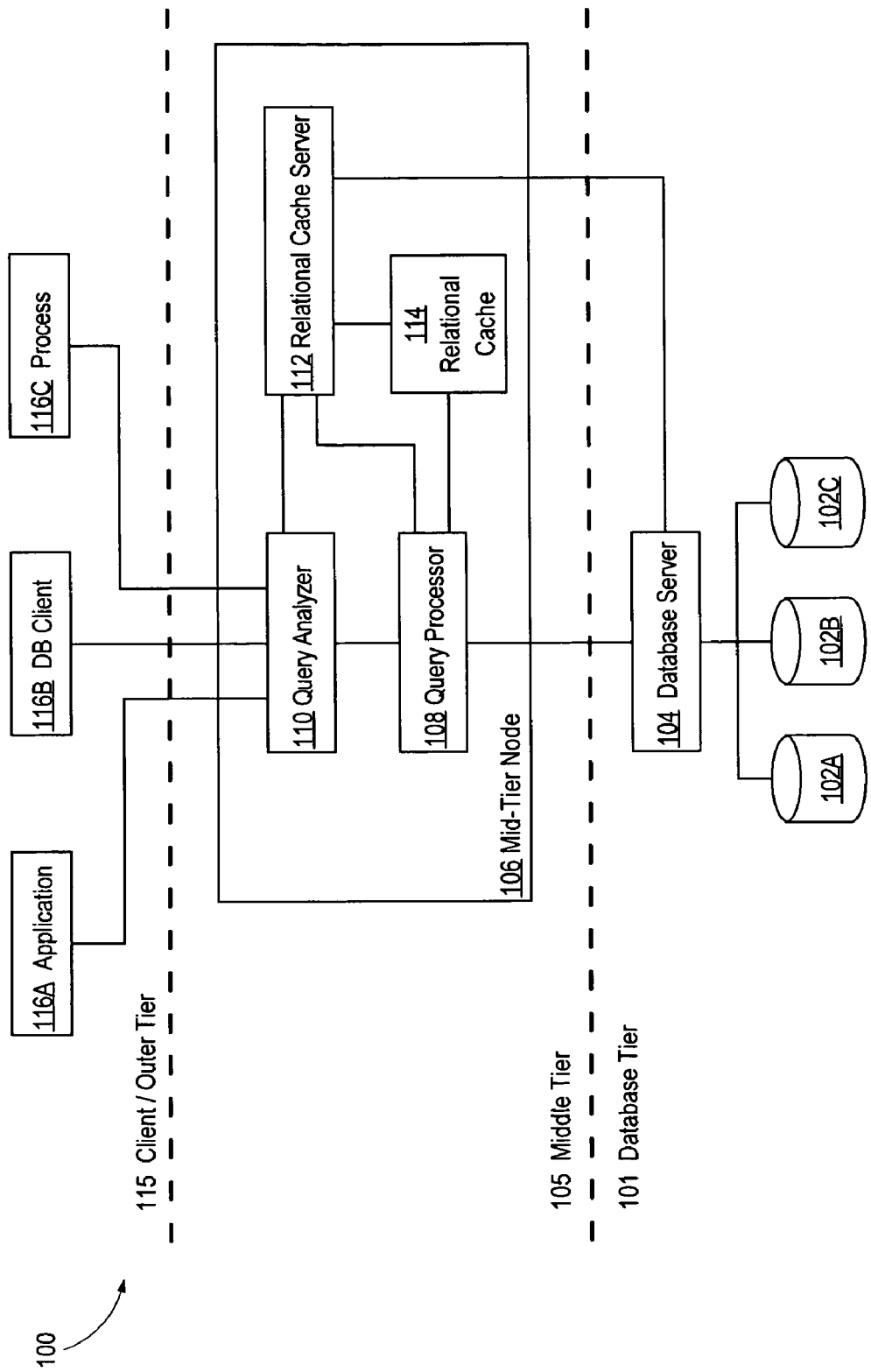
FIG. 1 is a block diagram that illustrates an overview of a multi-tier system in which an embodiment may be implemented.

FIG. 1 is a block diagram that illustrates an overview of a multi-tier system in which an embodiment may be implemented. Multi-tier system 100 comprises database tier 101, middle tier (or mid-tier) 105, and client/outer tier 115.

Database tier 101 comprises one or more database servers that manage one or more databases. "Database server" may refer collectively to a cluster of server instances and machines on which the instances execute. Generally, a server is combination of integrated software components and an allocation of computational resources, such as memory, a node, and processes on the node for executing the integrated software components on one or more processors, where the combination of the software and computational resources are dedicated to providing a particular type of function on behalf of clients of the server. Among other functions of database management, a database server governs and facilitates access to particular databases, and processes requests by clients to access the databases.

In the embodiment illustrated in FIG. 1, database server 104 is an RDBMS server and databases 102A, 102B, and 102C are relational databases. In other embodiments, the database tier may comprise one or more ORDBMS servers and one or more object-relational databases. According to the techniques described herein, database server 104 supports an XML datatype as a native built-in datatype and defines a database representation of the XML datatype in one or more database tables. In the embodiment illustrated in FIG. 1, at least one of databases 102A, 102B, and 102C is XML-enabled and is capable of natively storing XML data of the XML datatype.

As illustrated in FIG. 1, the database servers in database tier 101 are communicatively connected to one or more mid-tier nodes of mid-tier 105, which is positioned between the outer tier of multi-tier system 100 and the database tier. Mid-tier 105 comprises one or more mid-tier nodes, such as, for example, mid-tier node 106. Mid-tier node 106, and/or one or more components thereof, are communicatively connected to database server 104 through one or more communications mechanisms. The communication mechanisms facilitating the connections between mid-tier node 106 and database server 104 may be mechanisms of any type including, but not limited to, message-based communication mechanisms, event-based communication mechanisms, socket-based communication mechanisms, and Remote Procedure Call (RPC)-based communication mechanisms. Thus, the techniques described herein are not limited to any particular communication mechanism for connecting mid-tier nodes with database servers, and any now known or later developed communication mechanism may be used to facilitate communications with the database servers in the database tier.

Mid-tier node 106 is a computer system that is configured for implementing the techniques for processing queries described herein. As illustrated in FIG. 1, mid-tier node 106 comprises query processor 108, query analyzer 110, relational cache server 112, and relational cache 114. In some embodiments, the different components of a mid-tier node may be executing on the same hardware platform. In other embodiments, the components of a mid-tier node may be executing in a distributed environment on multiple hardware platforms, and the mid-tier node may further be providing other services, such as, for example, load-sharing and/or load-balancing. In some embodiments a mid-tier node may be executing multiple instances of its components; for example, a mid-tier node may be executing multiple query analyzers, multiple query processors, and/or multiple relational cache servers that manage multiple relational caches. Further, in some embodiments the functions of query analyzer 110, query processor 108, and relational cache server 112 may be performed by an integrated software component that may comprise one or more software modules. Thus, a mid-tier node that performs the techniques described herein is not limited to any particular structure or software implementation, and the techniques described herein may be implemented on mid-tier nodes of various configurations. For this reason, the embodiment depicted in FIG. 1 is to be regarded in an illustrative rather than a restrictive sense.

Relational cache 114 is configured for caching, in relational tables, data from relational databases 102A, 102B, and/or 102C. Relational cache 114 may be implemented in any computer-readable storage medium including, but not limited to, volatile memory such as Random Access Memory (RAM), persistent storage such as electromagnetic or optical disks, and mass network storage such as Network Attached Storage (NAS) or Storage Area Network (SAN). In some embodiments, in order to provide for increased capacity, relational cache 114 may be implemented as a combination of volatile memory, persistent storage, and/or mass network storage.

Relational cache server 112 is a software and/or hardware component that is configured to retrieve data into, and to manage, relational cache 114. In different embodiments, relational cache server 112 may be implemented in a variety of ways including, but not limited to, as a service, as a background process, as a library of functions, and as a dynamically linked library.

According to the techniques described herein, relational cache server 112 is communicatively connected to database server 104 and is configured to retrieve data from often-accessed relational tables that are managed by the database server in one or more relational databases. Relational cache server 112 stores the retrieved data into relational tables in relational cache 114. In addition, in some embodiments the relational cache server may also perform any other cache management functions including, but not limited to, updating cached data to reflect any changes made to the original data in the relational databases, swapping cached data in and out of the relational cache, and purging stale data from the relational cache. Further, in order to provide faster access to the relational tables in the relational cache, in some embodiments the relational cache server and/or another component of the mid-tier node (such as, for example, an indexing server) may also build and maintain B-tree indexes on the relational tables stored in the relational cache.

Query processor 108 comprises one or more components that are configured for processing queries according to the techniques described herein. In one embodiment, query processor 108 is capable of rewriting received queries into relational queries against relational tables that are stored in relational cache 114, compiling the relational queries, executing the relational queries, and returning result data in response to the received queries. Query processor 108 is communicatively connected to database server 104, relational cache server 112, and query analyzer 110. In different embodiments, query processor 108 may be implemented in a variety of ways including, but not limited to, as a standalone or an integrated software application, as a service, as a background process, as a library of functions, and as a dynamically linked library.

Query analyzer 110 is a software and/or hardware component that is configured for receiving and analyzing queries according to the techniques described herein. Query analyzer 110 is communicatively connected to relational cache server 112, query processor 108, and to entities in the client/outer tier 115 of multi-tier system 100. In one embodiment, query analyzer 110 is capable of receiving a query from entities in the client/outer tier 115 of multi-tier system 100, analyzing the received query, and determining whether the query includes one or more operators that request data of an XML datatype from the database server. In different embodiments, query analyzer 110 may be implemented in a variety of ways including, but not limited to, as a standalone or integrated software application, as a service, as a background process, as a library of functions, and as a dynamically linked library.

In operation, according to the techniques described herein mid-tier node 106 receives a query from an entity in client/outer tier 115 of multi-tier system 100. The entity in client/outer tier 115 that sends the query may be any entity capable of sending queries and other data requests to mid-tier node 106. Examples of such entities include, but are not limited to, software and/or hardware applications such as application 116A, various database clients such as DB client 116B, and any processes or application servers executing in a computer system such as process 116C.

At mid-tier node 106, query analyzer 110 receives the query and determines whether the query includes one or more operators for requesting data of an XML datatype, which data is stored by database server 104 in one or more of relational databases 102A, 102B, and 102C. ("Operator" refers to a command or a function that may take zero or more arguments and that may be placed in a database statement or query to perform a certain operation.) If the received query does not include operators that request data of the XML datatype (e.g. if the received query is a pure SQL query), query analyzer 110 may send the query for processing and execution to query processor 108. Query processor 108 may then execute the received query against tables stored in relational cache 114 or may send the query for execution to database server 104.

If the received query includes any operators for requesting data of the XML datatype (for example, one or more SQL/XML operators, one or more XQuery operators, one or more XPath operators, and/or one or more XSLT operators), query analyzer 110 may send a request to relational cache server 112 to retrieve, from database server 104 into relational cache 114, portions of one or more relational tables managed by database server 104. (As used herein, a "portion" of a table may refer to any particular set of data that is stored in the table including, but not limited to, a set of rows stored in the table, a table partition, and a disk partition that stores table data.) The one or more relational tables may store, in the one or more portions, the requested data of the XML datatype and/or the index information associated with the requested data. If relational cache server 112 determines that the requested data and/or the index information are already stored in relational cache 114, then relational cache server 112 simply notifies query processor 108 that the received query may be processed.

Query processor 108 then re-writes the received query into a relational query against the relational tables in relational cache 114. In this way, query processor 108 makes use of the requested data of XML datatype and/or of the index information associated with the requested, which are stored as portions of the relational tables in the relational cache. In some embodiments, rewriting the received query into a relational query may be performed by creating and then processing an Abstract Syntax Trees (AST) for the received query. In general, an AST is a representation of a set of executable statements. The AST representation is typically a tree structure in which internal tree nodes are associated with the operations included in the set of statements being represented by the AST, and the leaf tree nodes are associated with the operands for the operations specified in the internal tree nodes to which the leaf tree nodes are related.

In the embodiment illustrated in FIG. 1, the rewrite of the received query into relational query is performed by query processor 108 at compile time by first creating an Abstract Syntax Tree (AST) of the received query, and then translating this AST into a relational query AST, such as, for example, a SQL query AST. The relational query AST may then be used to generate an execution plan for the relational query. In some embodiments, the query processor and/or another component of mid-tier node may cache, or otherwise store for later use, the ASTs of the received query and the generated relational query, as well as any execution plans that are generated based on the relational query AST.

After the received query is rewritten into a relational query, query processor 108 executes the relational query to retrieve the requested data of XML datatype from relational tables in relational cache 114, where the relational tables accessed in the cache may store one or both of the requested data and the index information associated with the requested data. The retrieved data is thereafter returned to the entity in client/outer tier 115 that sent the initial query.

Functional Overview of One Embodiment

Figure 2:
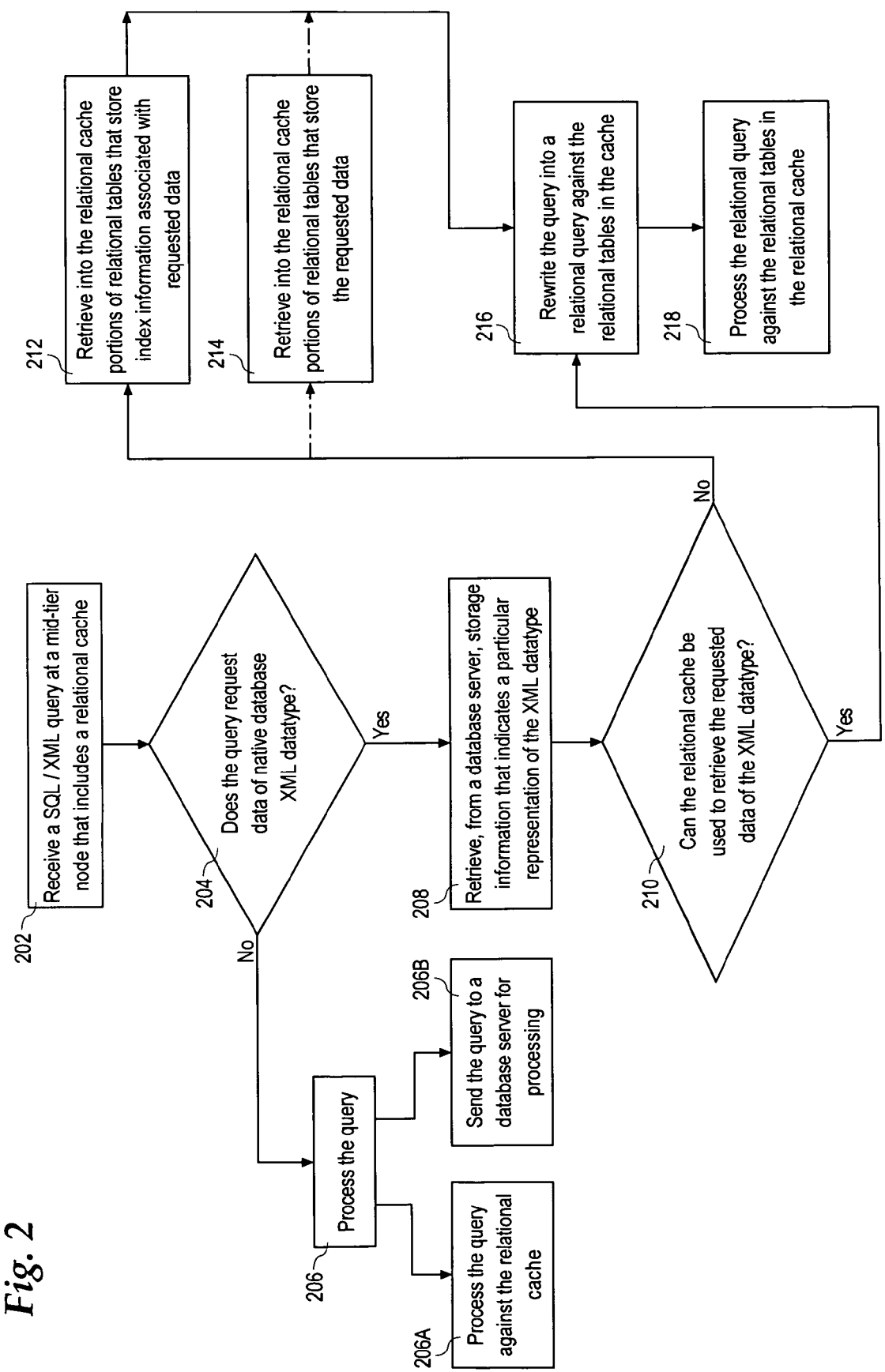
FIG. 2 is a flow diagram that illustrates an overview of a method for processing queries according to one embodiment of the techniques described herein.

FIG. 2 is a flow diagram that illustrates an overview of a method for processing queries according to one embodiment of the techniques described herein.

In step 202, a query is received at a mid-tier node of a multi-tier system. The mid-tier node is communicatively connected to a database server in a database tier of the multi-tier system. The mid-tier node includes a relational cache that is configured for caching relational tables from one or more databases managed by the database server.

In step 204, the mid-tier node or a component thereof determines whether the received query includes one or more operators for requesting data of an XML datatype, where the XML datatype is supported as a native datatype by the database server. For example, in one embodiment queries received by the mid-tier node may include SQL/XML operators for requesting data of the XMLType datatype, which conforms to the SQL/XML 2003 standard and is supported as a native datatype by an RDBMS server. The queries received by the mid-tier node may also include XQuery, XPath, and/or XSLT operators for requesting data that conforms to a native database XML datatype that provides support for representing instances of the XQuery Data Model.

If in step 204 it is determined that the received query requests only relational data and does not include one or more operators for requesting data of an XML datatype, then the query is processed at the mid-tier node in step 206. In some embodiments, processing the query in step 206 may include determining whether the requested relational data is stored in the mid-tier relational cache. If in step 206 it is determined that the requested relational data is stored in the mid-tier relational cache, then in step 206A the received query is processed against the tables cached in the relational cache, and the requested relational data is returned to the sender of the query. If in step 206 it is determined that the requested relational data is not stored in the mid-tier relational cache, then in step 206B the received query may be sent for processing to a database server in the database tier.

If in step 204 it is determined that the received query includes one or more operators for requesting data of an XML datatype, then processing the query continues in step 208. In step 208, the mid-tier node or a component thereof retrieves from a database server storage information that indicates a particular representation of the XML datatype. The storage information includes metadata that describes the structures of an XML-enabled storage in which data of the XML datatype is stored. In addition, the retrieved storage information may also include identifiers of one or more relational databases and/or one or more relational tables that store the requested data and/or index information associated with the requested data.

For example, in one embodiment the XML-enabled storage is an XML-enabled relational database that stores XML data as an XMLType datatype. This embodiment provides at least one of a Large Object (LOB) storage representation of the XMLType datatype, an object-relational storage representation of the XMLType datatype, and tree storage representation of the XMLType datatype. According to the LOB representation, an instance of XML data (e.g. an XML document or a set of XML nodes) is stored in a record of a relational table, where the instance is stored in a column of the table that is associated with an XMLType datatype. According to the object-relational representation, an instance of XML data is shredded into its XML elements and attributes and the element and attribute values are stored in columns of one or more relational tables, where the columns are associated with relational database datatypes. According to the tree storage representation of the XMLType datatype, an instance of XML data (e.g. an XML document or a set of XML nodes) is stored in a hierarchical data structure that preserves and reflects the hierarchical relationships among the XML elements in the instance of XML data. In addition, this embodiment may store, in relational tables, XML index information that is associated with the XML data of the XMLType datatype, where the XML index information may be created over any of a LOB storage, an object-relational storage, and a tree storage of the XML data. (Details about LOB, object-relational, and tree storage representations of XML datatypes, as well as details about XML index information, are described in separate sections hereinafter.) Thus, according to the techniques described herein, in this embodiment the storage information retrieved in step 208 includes metadata that indicates the type of storage of the requested data of the XMLType datatype (e.g. LOB storage, object-relational storage, or tree storage), and may also include the database, table, and column identifiers of the database or databases, table or tables, and column or columns that store the requested data and/or the XML index information that is associated with the requested data.

Based on the retrieved storage information, in step 210 a determination is made at the mid-tier node whether the relational tables cached in the mid-tier relational cache can be used to retrieve the requested data of the XML datatype. For example, based on the retrieved metadata and database, table, and/or column identifiers, in one embodiment it may be determined whether the relevant portions of the tables and/or columns, in which the index information associated with the requested data of the XML datatype is stored in the relational database, are actually cached in the mid-tier relational cache. It may also similarly be determined whether the relational cache stores the relevant portions of the tables and/or columns in which the requested data itself is stored in the relational database.

If in step 210 it is determined that the mid-tier relational cache can be used to retrieve the requested data of the XML datatype, then processing the query continues at the mid-tier node in step 216. However, if in step 210 it is determined that the mid-tier relational cache does not store the index information associated with the requested data and/or the requested data itself, then in step 212 the index information associated with the requested data is retrieved from the underlying relational database and is stored in relational tables in the relational cache. In some embodiments, in addition to retrieving the index information associated with the requested data of the XML datatype, in step 214 the portions of the relational tables in the underlying database, which store the requested data, may also be retrieved and stored in the mid-tier relational cache.

For example, in one embodiment XML data is stored natively in a relational database as an XMLType datatype. In this embodiment, the relational database may also store XML index information that is associated with the XML data. The XML index information may be an XML path index and/or an XML table index that is created over the XML data and is stored in relational tables. (Details about XML path indexes and XML table indexes are described in separate sections hereinafter.) In this embodiment, according to the techniques described herein, whenever a requested portion or instance of the XML data is not found in the mid-tier relational cache during the processing of a query, the XML index information associated with the requested data is retrieved and stored in one or more relational tables of the relational cache. In addition, depending on the particular representation of the XMLType datatype that is associated with the requested data, the relevant portions of the relational tables that actually store the requested data in the underlying relational database may also be retrieved and stored into the mid-tier relational cache.

When the index information associated with the requested data is retrieved and stored in the mid-tier relational cache, in step 216 the received query is rewritten into a relational query against the relational tables in the relational cache that store the index information. In addition, the generated relational query may be written to reference any relational tables in the mid-tier relational cache that may store some or all of the requested data if the requested data or portions thereof were retrieved into the relational cache from the underlying relational database.

For example, in one embodiment in which XML data is stored natively in a relational database as an XMLType datatype, a mid-tier node may rewrite a received query for an XML data instance into a relational query against the relational tables in the mid-tier relational cache. In this embodiment, rewriting the received query may be performed during compile time and may involve first creating an AST of the received query, and then translating this AST into a relational query AST that references the relevant relational tables in the mid-tier relational cache.

After the received query is rewritten into a relational query against the relational tables in the mid-tier relational cache, in step 218 the relational query is processed at the mid-tier node to retrieve the requested data of the XML datatype from the relational tables in the relational cache that store the relevant index information and/or the requested data. After the requested data is retrieved, it is returned to the sender of the received query.

In the embodiment illustrated in FIG. 2, the techniques for processing queries for XML data are described with respect to a mid-tier node that includes a relational cache. In other embodiments, the techniques for processing queries described herein may be implemented at a mid-tier node that includes an object-relational cache that is configured for caching objects from an ORDBMS database. Thus, the techniques for processing queries described herein are not limited to being implemented on any particular type of mid-tier node that includes any particular type of cache, and for this reason the embodiments of the techniques described throughout the present application are to be regarded in an illustrative rather than a restrictive sense.

Determining Whether a Query Requests Data of XML Datatype

According to the techniques described herein, in one embodiment a mid-tier node that includes a relational cache receives a query. In this embodiment, the received query may be of any type or format including, but not limited to, a pure SQL query (which includes only SQL operators), a SQL/XML query (which includes at least one SQL/XML operator, XQuery operator, XPath operator, and/or XSLT operator), a pure XQuery query (which includes only XQuery operators), a mixed XQuery query (which includes XQuery operators and at least one XPath and/or XSLT operator), an XPath query (which includes XPath operators), and XSLT query (which includes XSLT operators). After the query is received at the mid-tier node, the query is parsed and an AST is generated. A determination is made, based on the AST, whether the query includes any operators for data of XML datatype, such as, for example, SQL/XML operators, XQuery operators, XPath operators, and/or XSLT operators.

In other embodiments, the determination of whether the query includes any operators for data of XML datatype may be made by parsing the text of the query for keywords. For example, in these embodiments SQL queries and queries for XML data may be processed by separate query processors. Thus, it may be more efficient to use a SQL/XML parser to parse the received query and to make a determination to which query processor to dispatch the query for processing. Thus, the techniques described herein are not limited to any particular mechanism for determining whether a query received at a mid-tier node requests data of XML datatype.

If the query received at the mid-tier node includes one or more operators for data of XML datatype, storage information associated with the requested data is retrieved from a database server at the database tier. The retrieved storage information indicates that the requested data is stored according to a particular representation of the XML datatype in one or more databases managed by the database server. In addition, the retrieved storage information may also indicate whether any XML index information is available for the requested data, and if such index information is available, the storage information may also identify database relational tables and/or portions thereof that actually store the index information.

Based on the storage information, a determination is then made of whether the requested data of the XML datatype can be retrieved from relational tables that are stored in the relational cache. If the relational cache does not store the necessary data, then the relevant portions of the underlying database relational tables (which may include tables storing the requested data itself and/or any index information associated with the requested data) are retrieved from the database server and stored in the relational cache. The received query is then rewritten into a relational query against the tables in the relational cache, and is processed locally at the mid-tier node.

Storage Representations for Data of a Built-In XML Datatype

The techniques for processing queries for XML data described herein provide for retrieving into a mid-tier relational cache instances of XML data that are stored natively in a relational or object-relational database as a built-in XML datatype. Once the instances of the XML data are retrieved into relational tables in the mid-tier relational cache, the relational cache tables are used to efficiently process queries that request the instances of the XML data.

In one embodiment XML data is stored natively in a relational database as an XMLType datatype. In this embodiment, the XMLType datatype may be provided in both a LOB storage representation and/or an object-relational storage representation. In addition, some embodiments may provide for storing XML data as a tree storage representation, and in some embodiments the representation of data of the XML-Type datatype may be a SQL/XML view over relational tables. Thus, the techniques for processing queries described herein are not limited to any particular type of representation, and for this reason the types of XMLType datatype representations described herein are to be regarded in an illustrative rather than a restrictive sense.

According to the LOB representation, an instance of XML data is stored in a record of a relational table, where the instance is stored in a column of the table that is associated with an XMLType datatype. For example, an instance of XML data that is an XML document may be stored in a LOB column of a table record. The data stored in the LOB column may be of any LOB type, such as, for example, a Character LOB (CLOB) and a Binary LOB (BLOB). The LOB column of the table record may store the entire XML document, and the table may include multiple records for storing a collection of XML documents where each record stores a separate XML document in its LOB column. In cases in which the stored instances of XML data are large XML documents, instead of storing an entire XML document in a LOB column, the table record may store in the column a reference to an aggregate storage location that contains the particular XML document. The LOB representation of the XMLType datatype is useful for storing complex XML data because it can be used to store instances of the XML data regardless of their formats and/or schemas.

According to the tree storage representation, an instance of XML data (e.g. an XML document or a set of XML nodes) is stored in a hierarchical data structure that preserves and reflects the hierarchical relationships among the XML elements in the instance of XML data. For example, if the instance of XML data is an XML document, then the hierarchical data structure may represent a hierarchy that corresponds to the structure of the XML document and may include a node that corresponds to each XML element of the XML document. In different embodiments, the hierarchical data structure for storing XML data as tree storage representation may be created and maintained in various types of storage mechanisms, such as, for example, databases, file systems, and hard disk partitions.

According to the object-relational representation of the XMLType datatype, an instance of XML data is shredded into its XML elements and attributes and the element and attribute values are stored in columns of one or more relational tables, where the columns are associated with relational database datatypes. The instance of the XML data is typically an XML document for which an XML schema or a Document Type Definition (DTD) is available. The object-relational representation is useful for representing the hierarchical structure of an XML document as a set of relational tables.

For example consider the following XML document which stores a pending purchase order:

```
<?xml version="1.0">
<PurchaseOrder poStatus="pending">
    <poNo>735</poNo>
    <poDate>05-31-2006</poDate>
    <poLineItems>
        <lineItem>
            <itemName>CPU</itemName>
            <itemPrice>199.99</itemPrice>
        </lineItem>
        <lineItem>
            <itemName>memory</itemName>
            <itemPrice>24.99</itemPrice>
        </lineItem>
    </poLineItems>
</PurchaseOrder>
```

Since the XML schema of the above XML document is either known or can be easily determined, the XML document can be shredded into its XML elements and attributes. The content of the XML elements and the values of the attributes may then be stored in separate columns in one or more relational tables. In one example object-relational storage representation of the above XML document, a parent relational table may be created to store a record representing the XML document. The parent relational table includes columns for storing the purchase order status, the purchase order number, and the purchase order date. A child relational table may be created to store as a separate record each line item and its item name and item price elements. A primary/foreign key may be used to join the records in the parent and child relational tables. Table 1 below illustrates the structure and sample content of the parent relational table, Table 2 illustrates the structure and sample content of the child relational table, and the primary/foreign key is the value stored in columns "po_id". (The ellipsis in Table 1 and Table 2 below indicate that the tables may store as records other XML documents that store other instances of purchase orders and their line items).

TABLE 1

Parent Relational Table - Purchase Orders

| po_id | poStatus | poNo | poDate |
|---|---|---|---|
| ... | ... | ... | ... |
| rid1034 | pending | 735 | 05-31-2006 |
| ... | ... | ... | ... |

TABLE 2

Child Relational Table - Line Items

| lineitem_id | po_id | itemName | itemPrice |
|---|---|---|---|
| ... | ... | ... | ... |
| rid7952268 | rid1034 | CPU | 199.99 |
| rid7952269 | rid1034 | memory | 24.99 |
| ... | ... | ... | ... |

Index Information for Data of a Built-In XML Datatype

The techniques for processing queries for XML data described herein provide for retrieving into a mid-tier relational cache index information associated with XML data that is stored natively in a relational or object-relational database as a built-in XML datatype. The index information is typically stored as portions of relational tables in the mid-tier cache. Once the index information associated with a particular instance of XML data is retrieved and stored in tables in the mid-tier relational cache, the mid-tier node or components thereof may use these relational cache tables to efficiently process queries requesting the particular instance of the XML data by rewriting any received queries into relational queries against the relational cache tables.

In one embodiment, XML data is stored natively in a relational database as an XMLType datatype. In this embodiment, the XMLType datatype may be provided in any or all of a LOB storage representation, an object-relational storage representation, and a tree storage representation. This embodiment provides XML path index for XML data stored in LOB storage or any tree storage, and XML table index for XML data stored either in LOB storage, tree storage, or object-relational storage. According to the techniques described herein, in this embodiment XML path index information and XML table index information may be both cached in the mid-tier relational cache of a mid-tier node to facilitate efficient local processing of queries for XML data at the mid-tier node. For example, the mid-tier node or a component thereof may maintain B-tree indexes over the relational cache tables that store the XML path index information and/or XML table index information. Thus, by rewriting any received queries into relational queries against the relational cache tables, the mid-tier node or a component thereof may take advantage of the created B-tree indexes (e.g. by using an optimizer to optimize the relational queries) to efficiently access the XML index information stored in these relational cache tables.

XML Path Index Information

In general, the XML path index provided for XML data of XMLType datatype is stored as records in a relational table, where each record stores an indexed path to an XML fragment of an instance of the XML data. An XML path index may be created for XML data stored in both LOB storage and tree storage. (An XML fragment is a portion of an XML document such as, for example, a sub-tree of nodes within the XML document, an element of the XML document, an attribute of the XML document, and an XML sequence of elements that descend from a parent node but does not include the parent node.) For example, if an XML document is stored in a LOB column as an instance of LOB storage representation of the XMLType datatype, then a relational table storing the XML path index may provide one or more records that associate the paths to one or more XML elements of the document with LOB locators to the exact place in the LOB column where these elements are stored.

For example, suppose that an XML document is stored in a LOB column as an instance of LOB storage representation of the XMLType datatype. Suppose that the XML document includes the XML elements poNo, poDate, and poLineItems, where the poLineItems element includes separate lineItem elements named "CPU" and "memory". One example of an XML path index created over this XML document may be stored in a relational table, the structure and sample content of which are illustrated in Table 3 below:

TABLE 3

XML Path Index Relational Table

| doc_id | path | LOB_locator | value |
|---|---|---|---|
| ... | ... | ... | |
| rid588991 | /PurchaseOrder/poNo | Pointer into LOB | |
| rid588991 | /PurchaseOrder/poDate | Pointer into LOB | |
| rid588991 | /PurchaseOrder/poLineItems/lineItem/@itemName | Pointer into LOB | CPU |
| rid588991 | /PurchaseOrder/poLineItems/lineItem/@itemName | Pointer into LOB | memory |
| ... | ... | ... | |

In Table 3, the "LOB_locator" column in each record stores a pointer to a fragment of the XML document that is identified by the values stored in the "path" and/or the "value" columns. The particular XML document is identified by the value in the "doc_id" column. (For example, Table 3 shows XML path index information for one particular XML document that is identified by the value "rid588991".) The ellipsis in Table 3 indicate that XML path index information may be stored for other elements of the same or different XML documents.

The techniques described herein are not limited to the type of XML path index information illustrated in Table 3. Rather, the techniques described herein may be used in conjunction with any now known or later developed mechanisms for storing and processing XML path index information.

XML Table Index Information

In general, an XML table index provided for XML data of XMLType datatype is stored as records in a relational table, where each record stores, in separate columns, the content of one or more elements and/or the values of one or more attributes of an instance of the XML data. For example, XML table index may be built over an XML document that is stored in a LOB column as an instance of LOB storage representation of the XMLType datatype. In another example, XML table index may be built over an XML document that is stored in one or more relational tables as an instance of object-relational storage representation of the XMLType datatype. In another example, XML table index may be built over an XML document that is stored in one or more files as an instance of tree storage representation of the XMLType datatype. Further, instead of indexing every possible path within an XML document, an XML table index may provide index information for the XML document from an object-relational perspective, that is, as if the XML document is stored object-relationally in the database.

For example, consider the following XML document which stores a pending purchase order:

```
<?xml version="1.0">
<PurchaseOrder poStatus="pending">
    <poNo>735</poNo>
    <poDate>05-31-2006</poDate>
    <poLineItems>
        <lineItem>
            <itemName>CPU</itemName>
            <itemUnitPrice>199.99</itemUnitPrice>
            <itemQuantity>2</itemQuantity>
        </lineItem>
        <lineItem>
            <itemName>memory</itemName>
            <itemUnitPrice>24.99</itemUnitPrice>
```

-continued

```
            <itemQuantity>4</itemQuantity>
        </lineItem>
    </poLineItems>
</PurchaseOrder>
```

Regardless of whether the above document is stored in LOB storage, object-relational storage, or tree storage, an XML table index for the above document may be stored in a relational table. For example, if the most often accessed elements of a purchase order are the line items, then the relational table storing the XML table index may include columns only for the content of the sub-elements of the line item elements. An example of the structure and sample content of a relational table that may store such XML table index is illustrated in Table 4 below:

TABLE 4

XML Table Index Relational Table

| po_id | itemName | itemUnitPrice | itemQuantity |
|---|---|---|---|
| ... | ... | ... | ... |
| rid1034 | CPU | 199.99 | 2 |
| rid1034 | memory | 24.99 | 4 |
| ... | ... | ... | ... |

In Table 4, the "po_id" column in each record stores a value identifying the particular XML document that contains the indexed line items. (For example, Table 4 shows XML table index information for one particular XML document that is identified by the value "rid1034"; further, Table 4 shows that two records are stored in the XML table index for this particular XML document—one record each for the line items CPU and memory.) In Table 4, columns "itemName", "itemUnitPrice", and "itemQuantity" store the content of line item XML elements "itemName", "itemUnitPrice", and "itemQuantity", respectively. The ellipsis in Table 4 indicate that XML table index information may be stored for other XML documents that conform to the format of the above XML document.

The techniques described herein are not limited to the particular type or particular structure of XML table index information that is illustrated in Table 4. Rather, the techniques described herein may be used in conjunction with any now known or later developed mechanisms for storing and processing XML table index information.

Additional Types of Index Information

The techniques described herein are not limited to caching, in a mid-tier relational cache, index information that is XML path index information and XML table index information. Rather, the techniques described herein provide for caching into a mid-tier relational cache, and using from the mid-tier relational cache, any type of index information that may be available for a particular instance of XML data. For example, in one embodiment the mid-tier node may cache in the mid-tier relational cache results from text searches that have been previously performed on the XML data. In another embodiment, an indexing server may be used to index the underlying XML data, and the mid-tier node may store the resulting index information in the mid-tier relational cache to facilitate effective processing of queries against the XML data later on. Thus, the techniques described herein are not limited to providing caching of any particular type of index information, and for this reason the types of XML index information described herein are to be regarded in an illustrative rather than a restrictive sense.

Rewriting Queries for Data of XML Datatype into Relational Queries

According to the techniques described herein, after a mid-tier node that includes a relational cache receives a query for data of an XML datatype, the mid-tier node or a component thereof rewrites the query into a relational query against relational tables in the relational cache.

In one embodiment, XML data is stored natively in a relational database as an XMLType datatype. The XMLType datatype is supported natively by a database server in the database tier and may be provided according to any or all of a LOB storage representation, an object-relational storage representation, or a tree storage representation. This embodiment provides XML path index for XML data stored in LOB storage or tree storage, and XML table index for XML data stored in LOB storage, object-relational storage, and tree storage. According to the techniques described herein, in this embodiment XML path index information and XML table index information may be both cached in the mid-tier relational cache of a mid-tier node to facilitate efficient local processing of queries for XML data at the mid-tier node. In addition, in this embodiment the mid-tier node may also cache, in relational tables of the mid-tier relational cache, portions of the database relational tables that store the actual XML data that is requested by a query received at the mid-tier node.

In one embodiment, rewriting a query for data of XML datatype involves a mid-tier node or a component thereof rewriting the query to reflect the relational tables (and columns thereof) in the mid-tier relational cache that store the relevant index information and/or the requested data. In this embodiment, rewriting the received query may be performed during compile time and may involve first creating an AST of the received query, and then translating this AST into a relational query AST that references the relevant relational tables in the mid-tier relational cache.

For example, suppose that the following query Q1 is received at a mid-tier node:

select extract('/po/poNo') from PurchaseOrders

The above query is a SQL/XML query that includes the "extract( )" operator to extract an XML element from an XML document that is stored in an XML storage structure named PurchaseOrders.

If the XML document is stored in object-relational storage in the underling database and if the mid-tier relational cache includes a relational table that actually stores the requested data, then at compile the mid-tier node or a component thereof may create an AST for query Q1 and may then translate this AST into a SQL query AST, where the SQL query AST corresponds to the following SQL query Q1A:

select XMLElement("poNo",poNo) from PO where the relational table PO may have a structure similar to the structure illustrated in Table 1 above and may store the requested data. (In general, the SQL/XML XMLElement( ) function takes as an input argument a scalar value and returns an XML element whose content is the input scalar value.)

If the mid-tier relational cache includes a relational table that stores an XML table index over the requested XML document, then at compile the mid-tier node or a component thereof may create an AST for query Q1 and may then translate this AST into a SQL query AST, where the SQL query AST corresponds to the following SQL query Q1B:

select XMLElement("poNo",poNo) from PO_table_index where the relational table PO_table_index may store XML table index information for the requested data. (The '878 Application describes techniques for rewriting queries for data of XML datatype into relational queries against XML table index relational tables.)

If the XML document is stored in LOB storage in the underling database and if the mid-tier relational cache includes a relational table that stores XML path index information for the requested data, then at compile the mid-tier node or a component thereof may create an AST for query Q1 and may then translate this AST into a SQL query AST, where the SQL query AST corresponds to the following SQL query Q1C:

select MKXML('poNo',LOB_locator)
from path_index
where path='/po/poNo' where the relational table path_index may have a structure similar to the structure illustrated in Table 3 above and may store XML path index information that indicates, through the value in the LOB_locator column, the exact point in the storage where the requested XML element is located. (In general, the SQL/XML MKXML( ) function takes as an input argument data stored according to any kind of physical storage representation, and returns the data as an instance of XMLType datatype.) If the mid-tier relational cache also stores the relevant portion of the underlying database relational table that actually stores the XML document as LOB storage, then the value in the LOB_locator column may be pointing to the relational table in the mid-tier relational cache rather than to the storage location of the document in the underlying relational database.

In some embodiments, the techniques for rewriting queries for data of XML datatype at the mid-tier node may be similar to the techniques used by a database server to process the same queries at the database tier. A database server may use various techniques for rewriting queries to translate SQL/XML, XQuery, XPath, and XSLT operators into their equivalent SQL operators, as well as various techniques for translating queries for XML data into relational queries that reference various relational tables such as, for example, relational tables that store XML data of XMLType datatype and relational tables that store XML path index information and XML table index information. Thus, according to the techniques described herein, various now known or later developed techniques and mechanisms may be used at a mid-tier node to rewrite queries for data of XML datatype into relational queries that reference relational tables cached in a relational cache of the mid-tier node. For this reason, the techniques and examples of rewriting queries described herein are to be regarded in an illustrative rather than a restrictive sense.

Hardware Overview

Figure 3:
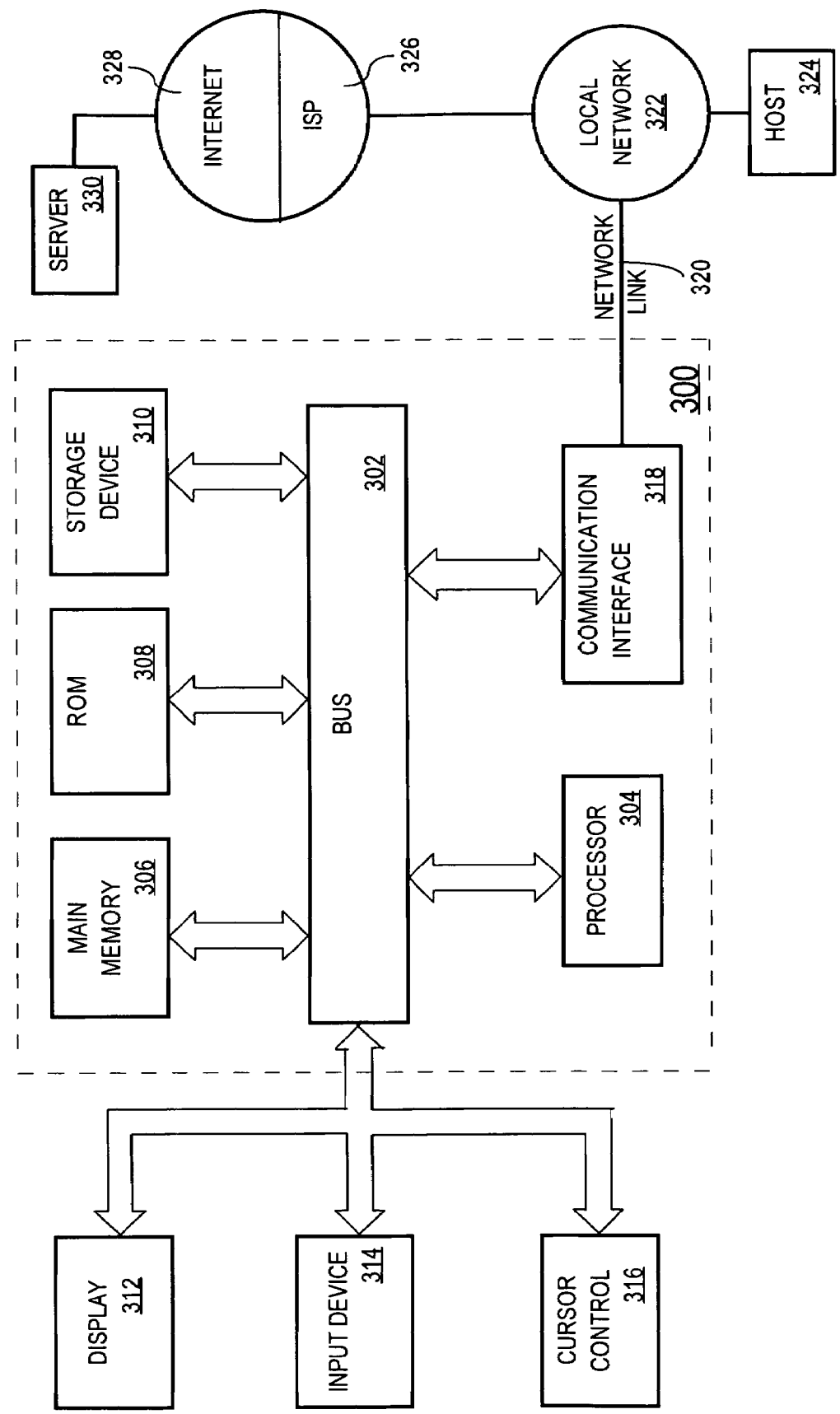
FIG. 3 is a block diagram that illustrates a computer system upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing queries, the method comprising the computer-implemented steps of:

receiving a query at a mid-tier node of a multi-tier system, wherein the mid-tier node is communicatively connected to a database server in a database tier of the multi-tier system;

wherein the mid-tier node includes a mid-tier cache that is configured to cache relational tables from one or more databases managed by the database server;

determining whether the query includes one or more operators for requesting first data of an eXtensible Markup Language (XML) datatype from the database server, wherein the XML datatype is supported as a native datatype by the database server; and if a determination is made that the query includes the one or more operators, then performing at least the steps of:

retrieving, from the database server, first one or more portions of first one or more relational tables that are managed by the database server, wherein the first one or more relational tables store index information associated with the first data of the XML datatype in the first one or more portions;

storing the first one or more portions of the first one of more relational tables in the mid-tier cache; and rewriting the query into a relational query against at least the first one or more portions of the first one of more relational tables that are stored in the mid-tier cache.

2. The method of claim 1, wherein, if a determination is made that the query includes the one or more operators, then performing at least the steps of:

retrieving from the database server storage information associated with the first data of the XML datatype, wherein the storage information indicates a particular representation of the XML datatype; and based at least on the storage information, identifying the first one or more relational tables.

3. The method of claim 2, further comprising:

based on at least one of the storage information and the index information, identifying second one or more portions of second one or more relational tables managed by the database server, wherein the second one or more relational tables store the first data of the XML datatype in the second one or more portions;

retrieving the second one or more portions of the second one or more relational tables from the database server; and storing the second one or more portions of the second one or more relational tables in the mid-tier cache;

wherein the step of rewriting the query into the relational query further comprises writing the relational query against the second one or more portions of the second one or more relational tables that are stored in the mid-tier cache.

4. The method of claim 3, further comprising:

at the mid-tier node, processing the relational query to retrieve the first data of the XML datatype from at least one of:

the first one or more portions of the first one or more relational tables that are stored in the mid-tier cache; and the second one or more portions of the second one or more relational tables that are stored in the mid-tier cache; and at the mid-tier node, responding to the query by sending the retrieved first data.

5. The method of claim 2, wherein:

the particular representation of the XML datatype indicates that the first data is stored by the database server in second one or more relational tables as Large Object (LOB) storage; and the index information includes an XML path index for the first data, wherein the XML path index stores one or more XML paths to elements of the first data in association with one or more corresponding LOB locators that point to fragments of the LOB storage where the elements are stored.

6. The method of claim 2, wherein:

the particular representation of the XML datatype indicates that the first data is managed by the database server as tree storage; and the index information includes an XML path index for the first data, wherein the XML path index stores one or more XML paths to elements of the first data in association with one or more corresponding locators that point to hierarchical nodes of the tree storage where the elements are stored.

7. The method of claim 2, wherein:

the particular representation of the XML datatype indicates that the first data is stored by the database server as object-relational storage in one or more columns of second one or more relational tables; and the index information includes an XML table index for the first data, wherein the XML table index stores one or more elements of the first data, wherein the one or more elements are retrieved into the XML table index from the one or more columns of the second one or more relational tables.

8. The method of claim 2, wherein:

the particular representation of the XML datatype indicates that the first data is stored by the database server in second one or more relational tables as Large Object (LOB) storage; and the index information includes an XML table index for the first data, wherein the XML table index stores one or more elements of the first data, wherein the one or more elements are retrieved into the XML table index from the second one or more relational tables.

9. The method of claim 2, wherein:

the particular representation of the XML datatype indicates that the first data is managed by the database server as tree storage; and the index information includes an XML table index for the first data, wherein the XML table index stores one or more elements of the first data, wherein the one or more elements are retrieved into the XML table index from one or more hierarchical nodes of the tree storage.

10. The method of claim 1, wherein:

the query is a first query and the one or more operators are first one or more operators; and the method further comprises:

receiving a second query at the mid-tier node;

determining that the second query includes second one or more operators for requesting second data of the XML datatype; and in response to the second query, retrieving at least a subset of the second data based on at least the index information stored in the first one or more portions of the first one or more relational tables that are stored in the mid-tier cache.

11. The method of claim 1, wherein the one or more operators include at least
one of:
an XML Query Language (XQuery) operator;
an XML Path Language (XPath) operator;
an eXtensible Style Language Transformation (XSLT) operator; and
a SQL/XML operator.

12. The method of claim 1, wherein the mid-tier node comprises one or more cache servers that manage the contents of the mid-tier cache.

13. The method of claim 1, further comprising:
if a determination is made that the query does not include the one or more operators, then performing at least one of the steps of:
processing the query against second one or more relational tables that are stored in the mid-tier cache; and
sending the query to the database server, wherein the database server processes the query against the one or more databases.

14. A machine-readable volatile or non-volatile medium storing one or more sequences of instructions which, when executed by one or more processors, causes the one or more processors to perform the method recited in claim 1.

15. A machine-readable volatile or non-volatile medium storing one or more sequences of instructions which, when executed by one or more processors, causes the one or more processors to perform the method recited in claim 2.

16. A machine-readable volatile or non-volatile medium storing one or more sequences of instructions which, when executed by one or more processors, causes the one or more processors to perform the method recited in claim 3.

17. A machine-readable volatile or non-volatile medium storing one or more sequences of instructions which, when executed by one or more processors, causes the one or more processors to perform the method recited in claim 4.

18. A machine-readable volatile or non-volatile medium storing one or more sequences of instructions which, when executed by one or more processors, causes the one or more processors to perform the method recited in claim 5.

19. A machine-readable volatile or non-volatile medium storing one or more sequences of instructions which, when executed by one or more processors, causes the one or more processors to perform the method recited in claim 6.

20. A machine-readable volatile or non-volatile medium storing one or more sequences of instructions which, when executed by one or more processors, causes the one or more processors to perform the method recited in claim 7.

21. A machine-readable volatile or non-volatile medium storing one or more sequences of instructions which, when executed by one or more processors, causes the one or more processors to perform the method recited in claim 8.

22. A machine-readable volatile or non-volatile medium storing one or more sequences of instructions which, when executed by one or more processors, causes the one or more processors to perform the method recited in claim 9.

23. A machine-readable volatile or non-volatile medium storing one or more sequences of instructions which, when executed by one or more processors, causes the one or more processors to perform the method recited in claim 10.

24. A machine-readable volatile or non-volatile medium storing one or more sequences of instructions which, when executed by one or more processors, causes the one or more processors to perform the method recited in claim 11.

25. A machine-readable volatile or non-volatile medium storing one or more sequences of instructions which, when executed by one or more processors, causes the one or more processors to perform the method recited in claim 12.

26. A machine-readable volatile or non-volatile medium storing one or more sequences of instructions which, when executed by one or more processors, causes the one or more processors to perform the method recited in claim 13.

* * * * *

UNITED STATES PATENT AND TRADEMARK OFFICE
CERTIFICATE OF CORRECTION

PATENT NO. : 7,499,909 B2 Page 1 of 1
APPLICATION NO. : 11/481159
DATED : March 3, 2009
INVENTOR(S) : Liu et al.

It is certified that error appears in the above-identified patent and that said Letters Patent is hereby corrected as shown below:

On the Title Pg, on page 3, Item (56), under "Other Publications", line 13, delete "Preli minary" and insert -- Preliminary --, therefor.

On the Title Pg, on page 3, Item (56), under "Other Publications", line 61, after "Fast" insert -- index --.

On the Title Pg, on page 4, Item (56), under "Other Publications, line 54, after "rewriting" insert -- through --.

Signed and Sealed this

Eighteenth Day of May, 2010

David J. Kappos
*Director of the United States Patent and Trademark Office*